United States Patent [19]
Goebel

[11] Patent Number: 4,550,524
[45] Date of Patent: Nov. 5, 1985

[54] RODENT TRAP

[76] Inventor: Joseph A. Goebel, 319 S. Barker Ave., Evansville, Ind. 47712

[21] Appl. No.: 643,554

[22] Filed: Aug. 23, 1984

[51] Int. Cl.$^4$ .................. A01M 23/10; A01M 23/30
[52] U.S. Cl. .................................................. 43/75; 43/78
[58] Field of Search ........................ 43/73, 75, 77, 78

[56] References Cited

U.S. PATENT DOCUMENTS

| | | | |
|---|---|---|---|
| 1,464,697 | 8/1923 | Connolly | 43/75 |
| 2,555,641 | 4/1946 | Goldsmith | 43/76 |
| 3,362,100 | 1/1968 | Winkler | 43/78 |

Primary Examiner—Nicholas P. Godici
Assistant Examiner—Samuel M. Heinrich
Attorney, Agent, or Firm—Warren D. Flackbert

[57] ABSTRACT

A rodent trap characterized by a rodent receiving chamber, a partition selectively movable across the chamber in a rodent eradicating relationship, a movable floor portion continually urged to an overlying position with respect to a rodent receiving tray, where the floor portion moves with the partition and cam action releases the floor portion to the aforesaid overlying position. A pressure sensitive switch holds the rodent bait and initiates sequential operation. The trap further employs a two-way solenoid for partition movement and a one-way gearing arrangement for selective floor portion position control.

7 Claims, 7 Drawing Figures

U.S. Patent  Nov. 5, 1985  4,550,524

RODENT TRAP

As is known, while many types of rodent traps have been developed and marketed, the inventor herein presents a form which, in consecutive steps, lures the rodent, by means of bait, into a passageway; automatically triggers the movement of a partition to a rodent killing condition in response to the rodent's nibbling of the bait; withdraws the partition together with a portion of the passageway floor proximate the bait to permit the rodent's remains to fall into an underlying container; and, return both the partition and the passageway floor portion to the original condition.

In other words, rodent killing is positively and sequentially controlled, where partition movement is achieved through double-acting solenoid action and where a one-way gear is employed to selectively permit the withdrawal of the partition to an initial or pre-operational position and, at the same time, allow the floor movement or return, also to the pre-operational position, due to the release of compressed springs. Overall initiation of the trap is based on the actuation of a pressure sensitive switch which serves to retain the bait for rodent attraction.

Figure 1:
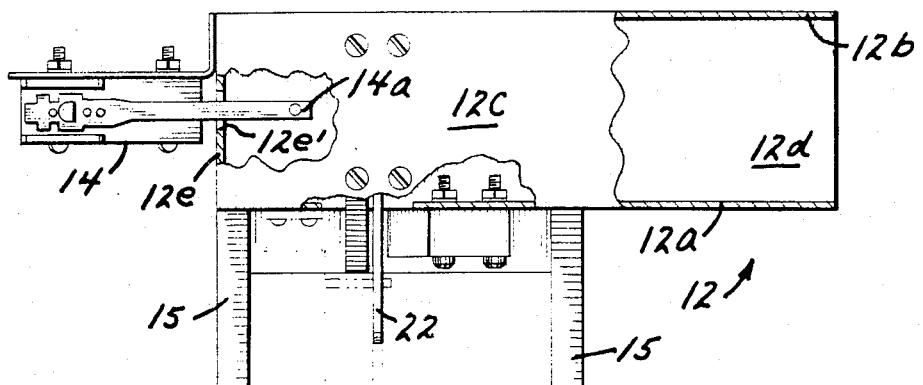
Figure 2:
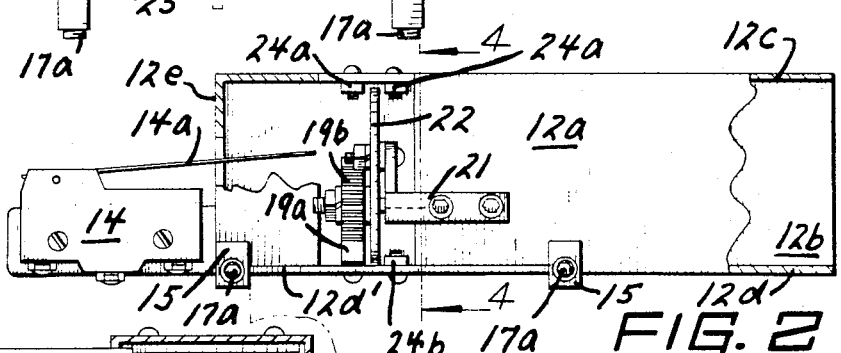
Figure 3:
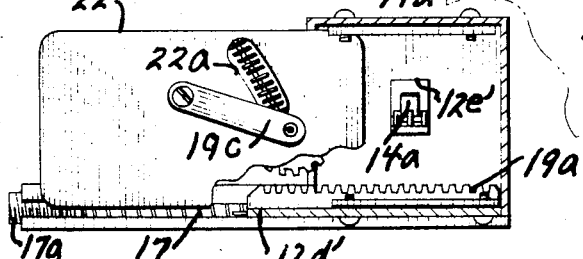
Figure 4:
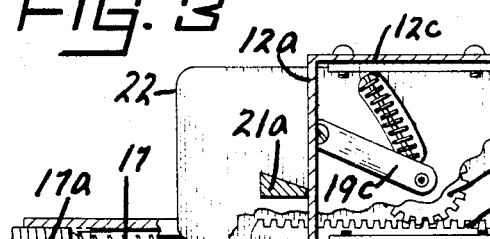
Figure 6:
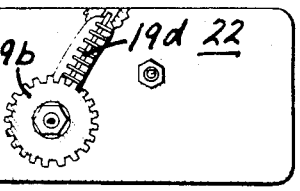
Figure 5:
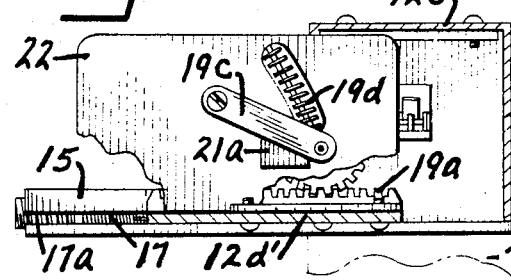
Figure 7:
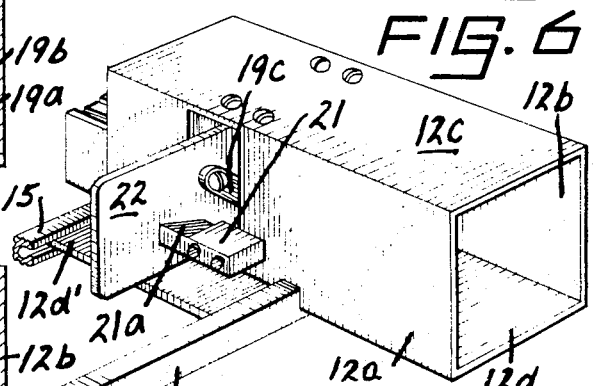

In any event, a better understanding of the present invention will become more apparent from the following description, taken in conjunction with the accompanying drawing, wherein FIG. 1 is a top plan view of a rodent trap in accordance with the teachings of the present invention;

FIG. 2 is a view in side elevation of the rodent trap of FIG. 1;

FIGS. 3, 4 and 5, each in vertical section and partly fragmentary, are comparable to each other, being taken at line 4—4 on FIG. 2 and looking in the direction of the arrows, illustrate an operational sequence;

FIG. 6 is a view of the movable partition, detailing the side thereof opposite to that of FIGS. 3, 4 and 5; and, FIG. 7 is a perspective view of the instant rodent trap, being representative of the condition of FIG. 4.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the rodent trap of the invention is characterized by an open ended elongated hollow tubular body 12, affording a rodent receiving passageway or chamber, including side walls 12a and 12b, a top wall 12c, a bottom wall 12d, where the latter, serving as a floor, is further defined by a laterally slidable portion 12d', and a rear wall 12e. A pressure sensitive switch 14 is mounted onto the body 12, where a bait (not shown) retaining arm 14a thereof extends through opening 12e' in the rear wall 12e.

The rodent trap also includes lateral extending arms 15, mounted on the body 12, which receive the slidable floor portion 12d', where spring members 17, retained by threaded plugs 17a, continually urge such into a first condition, i.e. in a covering relationship with respect to a tray or container 20 (shown in phantom in FIGS. 2 and 5) for rodent receiving.

A movable partition 22 is laterally disposed with reference to the longitudinal axis of the body 12, being positioned immediately above floor portion 12d' and operative by reason of a two-way solenoid 25 (shown in phantom in FIG. 1 at the travel positions of partition 22). A linear strip of gear teeth 19a is secured to the upper surface of slidable floor portion 12d', being cooperative with a one-way gear 19b rotatably positioned on a surface of partition 22 (see FIG. 6). Gear 19b pivots, in arcuate slot 22a, in response to movement of arm 19c (to which it is secured) towards, by a spring 19d, a camming surface 21a defined on a member 21 bolted onto and extending from side wall 12a of the body 12.

As particularly evident in FIG. 2, for example, the path of movement of partition 22 is controlled by a pair of upper guides 24a and a lower guide 24b in combination with the strip of gear teeth 19a. It should be evident, therefore, that the overall assembly of the rodent trap presented by the invention affords an arrangement of components readily adapted to the operational modes described herebelow.

In this regard, and at an initial condition, i.e. awaiting the arrival of a rodent, reference is directed to FIG. 3 which illustrates the partition 22 at an outer position (due to two-way solenoid 25) providing ready entry of the rodent to the bait on retaining arm 14a of switch 14. At this time, the floor portion 12d' overlies, i.e. covers, the receiving tray 20 and the camming surface 21a prevents the engagement of the gear 19b with gear teeth 19a.

When the bait is taken, movement of switch arm 14a energizes the two-way solenoid 25, causing the partition 22 to move to its innermost position and, at the same time, destroying the rodent in its path of movement. As apparent in FIG. 4, arm 19c has been released from its position on the camming surface 21a and gear 19b engages gear teeth 19a.

Electrical circuitry (not detailed) causes the movement of the solenoid 25 toward its outermost position, but, in this instance, together with floor portion 12d' due to the coaction of gear 19b-gear teeth 19a. The remains of the rodent drop into the tray 20. As partition 22 moves outwardly, gear teeth 19a-gear 19b finally disengage (because of camming surface 21a) and the floor portion 12d' returns to the position of FIG. 3 by spring members 17 force. With the rodent trap in the position of FIG. 3, the operational sequence is again in readiness to be initiated.

From the preceding, it should be evident that the rodent trap presented herein is effective in operation, as in the luring, destroying and disposing of a rodent. The rodent trap is susceptible, of course, to changes within the spirit of the invention, as, for example, in proportioning; the selection of material for fabrication; the mounting of the pressure sensitive switch and the two-way solenoid; the particular gearing arrangement; and, the like. Thus, the preceding should be considered illustrative and not as limiting the scope of the following claims:

I claim:

1. A rodent trap comprising a rodent receiving chamber, bait retaining means within said chamber selectively controlling operational sequence, said chamber having a floor with a slidable portion continually urged into a position overlying a rodent receiving member, a partition movable across said chamber from a first position to a second or eradicating position, means moving said partition in response to movement of said bait retaining means to eradicate said rodent, said partition and said slidable portion of said floor being operatively connected so as to be movable together out of said rodent receiving chamber to allow the rodent to fall into said rodent receiving member, and cam means selectively releasing said slidable portion of said floor from operative partition so that said floor portion may return to said overlying position.

2. The rodent trap of claim 1 where said cam means is disposed on a side wall of said rodent receiving chamber in an operative relationship between cooperative gearing on said partition and said slidable portion of said floor.

3. The rodent trap of claim 1 where spring means urge said slidable portion of said floor into said overlying position.

4. The rodent trap of claim 1 where said bait retaining means is a pressure sensitive switch.

5. The rodent trap of claim 1 where said partition is solenoid controlled.

6. The rodent trap of claim 2 where said cooperative gearing is operationally uni-directional.

7. The rodent trap of claim 1 where said cam means is an inclined surface on a side wall of said rodent receiving chamber.

* * * * *

UNITED STATES PATENT AND TRADEMARK OFFICE
CERTIFICATE OF CORRECTION

PATENT NO. : 4,550,524

DATED : November 5, 1985

INVENTOR(S) : Joseph A. Goebel

It is certified that error appears in the above-identified patent and that said Letters Patent is hereby corrected as shown below:

Column 3, line 9, after "operative" and before "partition" should be --connection to said--.

Signed and Sealed this

Fourteenth Day of January 1986

[SEAL]

Attest:

Attesting Officer

DONALD J. QUIGG

Commissioner of Patents and Trademarks